Dec. 6, 1966 W. GOEHRING 3,290,030
APPARATUS FOR THE GENERATION OF A FURNACE
ATMOSPHERE FOR THE HEAT TREATMENT
OF METALS, ESPECIALLY OF STEEL
Filed Sept. 16, 1964

INVENTOR.
Werner Goehring
BY
ATTORNEY

United States Patent Office 3,290,030
Patented Dec. 6, 1966

3,290,030
APPARATUS FOR THE GENERATION OF A FURNACE ATMOSPHERE FOR THE HEAT TREATMENT OF METALS, ESPECIALLY OF STEEL
Werner Goehring, Schneiderweg 63, 7051 Neustadt, Kreis Waiblingen, Germany
Filed Sept. 16, 1964, Ser. No. 396,980
Claims priority, application Germany, Sept. 21, 1963, G 38,746
2 Claims. (Cl. 266—5)

This invention relates to a process and apparatus for generating a furnace atmosphere for the heat treatment of metals, especially steel. The atmosphere is generated by means of the combustion of a flowable fuel with insufficient air to produce complete combustion in a combustion chamber and the gases so produced are conducted into the chamber where the work pieces are processed. Such furnace atmospheres are known, but the desired reducing effect upon the metallic work pieces occurs only at high treatment temperatures. It is therefore possible to heat the processed material free of oxide; but when cooling the work pieces under this atmosphere, an undesired oxide layer is formed which, in the case of steel, becomes visible through oxidation tint. This is due to the fact that, with falling temperatures, steel becomes increasingly susceptible to the water vapor component of combustion, and to the free oxygen present in the furnace atmosphere. But if so little combustion air is added to the fuel that the combustion gases just contain the minimum permissible portion of water vapor for the oxidation-free cooling of steel, the combustion temperature and thus the reaction velocity of fuel and of air become too small. This is particularly the case when the combustion takes place in a large chamber and the burning gases immediately radiate heat to their surroundings. Here, the hydrocarbons of the fuel dissociate and burn only incompletely with the liberation of carbon. The oxygen of the combustion air then combines predominantly with the rapidly burning hydrogen portion of the fuel; thus, the combustion gases do not take up the required small content of water vapor. Besides, because of the small reaction velocity, no sufficiently extensive combination of free oxygen with the molecules of the fuel takes place.

Furnace atmospheres are also known in which a transfer of carbon to the material is aimed for through the dissociation of fuel hydrocarbons at the surface of the material that are more unstable at higher temperatures. Prior to contact with the processed material the combustion gases are not in a state of equilibrium. Therefore, the capability of the furnace atmosphere to give off carbon, the so-called carbon potential, cannot be determined by measuring one combustion-gas component.

As a remedy for all these disadvantages, the combustion gases can be reacted in a heated chamber and brought into a predetermined state of equilibrium above the temperature of the material which, as a rule, corresponds to a reaction temperature of from 1000 to 1200° C. The heating of the reaction chamber requires a large, heat-transmitting surface, and therefore leads to large chamber dimensions. It is difficult to merge this chamber as a structural unit with the processing chamber of the work pieces. Moreover, the heating installation of the reaction chamber influences the temperature of the processing chamber in an undesirable manner.

In view of the foregoing considerations it is an object of this invention to provide a process and an apparatus for producing furnace atmospheres permitting the production of combustion gases without pretreatment also for the purposes of bright annealing and oxidation free cooling of steel or for cementation of steel in a combustion chamber connected with the treating chamber for the work pieces. A few examples are given in the appended table.

TABLE OF EXAMPLES

| Type of Heat Treatment | Fuel (characterized hydrocarbons) | Lack of Air (Supplement of air in proportion to amount of air in the case of complete combustion) | Theoretical combustion temperature, °C. | Composition of the combustion gases (at 1,100° C. in a state of equilibrium), percent | | | | | Required preheating in order to reach the theoretical combustion temperature of 1,100° C. | |
|---|---|---|---|---|---|---|---|---|---|---|
| | | | | $CO_2$ | $CO$ | $H_2O$ | $H_2$ | $N_2$ | Air preheating, °C. | Mixture preheating, °C. |
| Bright annealing and oxidation-free cooling of steel. | Benzene vapor $C_6H_6$. | 0.55 | 1,620 | 5.0 | 19.5 | 4.15 | 8.1 | 63.25 | None | None |
| | Light fuel oil | 0.52 | 1,300 | 4.3 | 16.2 | 6.9 | 13.0 | 59.6 | None | None |
| | Propane $C_3H_8$ | 0.46 | 1,230 | 3.0 | 16.0 | 7.0 | 18.3 | 55.7 | None | None |
| | Methane $CH_4$ | 0.4 | 975 | 2.1 | 14.5 | 7.7 | 25.5 | 50.2 | 220 | 160 |
| Cementation or decarburization-free annealing of steel. | Benzene vapor $C_6H_6$. | 0.4 | 1,180 | Trace | 29.5 | Trace | 14.75 | 55.75 | None | None |
| | Propane $C_3H_8$ | 0.3 | 600 | Trace | 23.7 | Trace | 31.6 | 44.7 | 890 | 590 |

An understanding of the invention can be had by reading the following description in conjunction with the accompanying drawings wherein.

Figure 1:
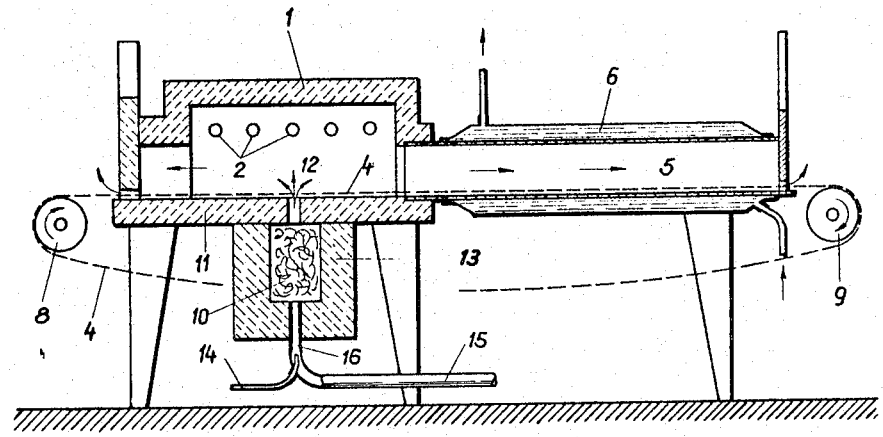
FIGURE 1 shows a furnace constructed in accordance with the invention.

The dimensions of the reaction chamber can be kept small if the required reaction temperature is exclusively provided by the heat generated during combustion. For this purpose, hydrocarbons, the molecules of which consist only of carbon and hydrogen or fuels essentially containing these hydrocarbons, are burned in a combustion chamber which is connected with the processing chamber of the work pieces preferably forming a structural unit with it, and which is protected against considerable heat losses, and is of such small volume that the combustion gases reach a high combustion temperature and assume a state of equilibrium above the temperature of the material; thus, these gases influence the carbon content of the steel exclusively by the combustion gas component CO and/or avoid any oxidation during the annealing and subsequent cooling of the steel.

As a rule, in comparison to other flowable fuels, the hydrocarbons contain little hydrogen in proportion to carbon. They therefore bring the advantage that during the combustion, combustion gases low in water vapor are generated. If the combustion takes place under conditions of insufficient air with regard to the required content of combustion-gas components which have a reducing effect ($H_2+CO$), the hydrocarbons still permit a relatively high supplement of air, since they have no combined oxygen. Thus, the theoretical combustion temperature lies in many cases higher than the conventional processing temperatures of the work pieces. In the case of combustion of the hydrocarbon-air mixture in the small combustion chamber, the volume of which is designed no larger than required for the process of the combustion reaction at the attainable temperature—preferably in the presence of reaction acceleration filling material—a high combustion temperature occurs. This is based upon a heat reflection of the adjacent chamber surface onto the burning gases. Due to the small surface and the thermal protection of this combustion chamber as well as possibly through the structural unification with the chamber of the work pieces, the heat losses can be kept so low that the combustion gases almost reach the theoretical combustion temperature. Then, due to the high reaction velocity at a high combustion temperature, they assume the characterized state of equilibrium.

In the case of employing these gases for the cementation of work pieces, in accordance with Boudouard's reaction $2CO \rightarrow CO_2 + C$, the transfer of carbon takes place exclusively through the dissociation of the carbon monoxide at the colder surface of the work pieces which is more stable at higher temperatures. Because of the attained state of equilibrium the composition of the combustion gases permits an unambiguous conclusion to be made concerning the cementation effect. Then, for this reason, the measurement of one single combustion-gas component is sufficient (mostly water-vapor determination by means of measurement of the dew point).

In the case of employing the combustion gases for the bright annealing of steel, the cooling material is not oxidized with the combustion gases that are in this manner generated with a relatively high supplement of air, although these gases contain more water vapor in proportion to hydrogen than is permissible for oxidation-free cooling according to the known values. Obviously, this oxidation is avoided through the high content of carbon monoxide that is present due to the composition of the fuel. Here it is likely that water vapor reacts locally with carbon monoxide under the catalytic influence of the work piece surfaces up to the state of equilibrium that corresponds to the momentary temperature of the material; at this state of equilibrium the gases then have a reducing effect in accordance with the known values.

In the further development of the process according to the invention, air or a hydrocarbon-air mixture is introduced into the combustion chamber via a preheater to supply the combustion components with an amount of heat which, together with the amount of heat released during combustion, provides for the required high reaction temperature. For this purpose the heating installation of the processing chamber as well as the heat of the cooling material of continuously fed furnaces can be used.

It has been found that, in the case of a hydrocarbon-air mixture which flows faster than its combustion velocity, no precombustion and, above all, no cracking connected with undesirable separation of carbon occurs within the preheater. This fact is based upon the circumstance that the carbon of the hydrocarbon which disassociates upon strong heating, adds in statu nascendi to the oxygen present in the mixture. Thus, only gasous products of cracking are brought about; these burn free of soot in the combustion chamber.

The purpose of the preheating of the combustion components is, on the one hand, to reach, in the case of some hydrocarbons, the required high theoretical combustion temperature, especially with the small permissible supplement of combustion air for the production of combustion gases with carburizing effect. On the other hand, for the production of combustion gases that only prevent oxidation, in the case of which a larger supplement of air is permissible, the processing chamber can, exclusively or partly, be directly heated by means of the hot combustion gases. In the case of the employment of a heating installation, it is expedient to use it only for the preheating of the processed material, since then it is only subject to a smaller thermal stress.

By means of the process according to the invention it has thus become feasible to generate furnace atmospheres for bright-annealing and bright-cooling purposes for as well as for decarburization-free annealing, and also for carburization of steel in a simple furnace installation of the same kind, and in this manner to make use of the economical and technical advantages of the known employment of unprocessed combustion gases also for the above-mentioned purposes. With the processes known to date for the operation of such installations one can, without additional heating facilities for the combustion chamber, even with the employment of reaction-accelerating agents such as catalysts or gas circulation, produce only for bright-annealing purposes a usable furnace atmosphere which, does not permit any bright cooling and does not make possible workable control of the carbon potential by means of a simple dew point measurement. They therefore suffice only for inexacting requirements with regard to the surface quality of processed work pieces.

Figure 2:
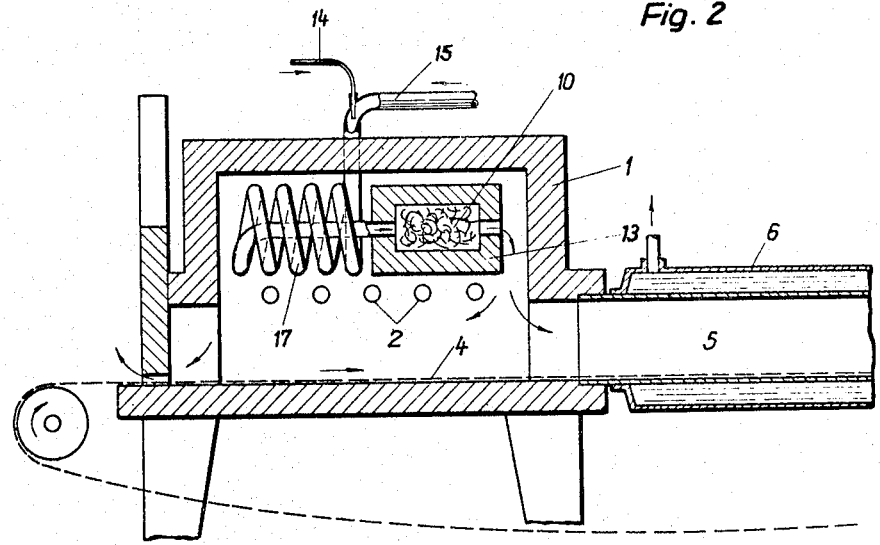
FIGURE 2 shows a second form of the invention.

FIGURE 1 and 2 schematically represent two forms of a furnace constructed in accordance with this invention. In both forms a cooling tunnel 5 with a cooling water jacket 6 is connected, with a bright-annealing or brazing furnace 1 heated by radiation heating tubes 2. For conveying of the work material a heat-resistant metallic conveyor belt 4 indicated by dotted lines, and running between two runners 8 and 9, is used.

For the generation of the combustion gases serving as furnace atmosphere, in the form of construction according to FIGURE 1, a combustion chamber 10 is located at the lower side of annealing furnace 1. This combustion chamber contains fireproof and preferably catalytically acting filling material and empties into the annealing chamber by means of an opening 12 incorporated at the bottom of the annealing furnace or elsewhere. The opening 12 can also be connected with the combustion chamber 10 by means of a pipe line not sketched here. During the combustion of gaseous hydrocarbons of the more detailed composition, a gas-air mixture that is mixed in a conveyor fan not illustrated here, is conducted to this chamber, the walls 13 which consist of high-quality, heat-resistant and heat-retaining materials. In case of the employment of liquid hydrocarbons they are conducted via nozzle 14 in a finely atomized form to the preferably heated air flowing in conduit 15 and a desired mixture of vaporous hydrocarbons and air is produced in section 16, the combustion of which brings about the furnace atmosphere with the above-described characteristics.

In the case of the form of construction according to FIGURE 2, the combustion chamber 10 and the preheater 17 are situated within the annealing furnace 1. To this combustion chamber 10 the hydrocarbon-air mixture is conducted via preheater 17 the flow cross section of which is measured in such a way that the flow velocity of the mixture is greater than its combustion velocity. The hydrocarbon supply line 14, in a form of construction not illustrated here, can also be conducted into the preheater in the annealing furnace; thus the front part of the preheater is used for the heating of the combustion air and the rear part of the preheater for the mixture formation and further preheating of the mixture.

The process according to the invention can be employed at all furnace installations suitable for protective-gas operation with burning gases and the apparatus shown in each of FIGURES 1 and 2 can be adjusted by varying the fuel and air delivered by conduits 14 and 15 into mixing chamber 16 to deliver the proper combustible mixture to the combustion chamber to produce the desired furnace atmosphere.

With these and further objects in view, as may become apparent from the within disclosure, the invention consists not only in the method, apparatus and structure herein pointed out, but includes further methods, apparatus and structures coming within the scope of what may be claimed.

I claim every novel feature shown or disclosed herein and in particular:

1. A furnace comprising a heating chamber and a cooling chamber and means for conveying the material to be treated through the heating chamber to the cooling chamber, a combustion chamber and a preheater supported in the heating chamber, said preheater being connected to the combustion chamber, means for conducting a combustible mixture of hydrocarbon fuel and air to the combustion chamber, and means for conducting the products of combustion from the combustion chamber to the heating chamber and the cooling chamber of the furnace, by which oxidation during annealing and subsequent cooling of the workpieces is prevented or workpieces are controlled carburized by measuring of a single combustion gas component.

2. A furnace comprising a heating chamber and a cooling chamber and means for conveying the material to be treated through the heating chamber to the cooling chamber, a combustion chamber supported in the heating chamber and a preheater connected to said chamber and located completely within said heating chamber, means for conducting a combustible mixture of hydrocarbon fuel and air to the combustion chamber, and means for conducting the products of combustion from the combustion chamber to the heating chamber and the cooling chamber of the furnace, by which oxidation during annealing and subsequent cooling of the workpieces is prevented or workpieces are controlled carburized by measuring of a single combustion gas component.

References Cited by the Examiner

UNITED STATES PATENTS

| | | | |
|---|---|---|---|
| 2,275,106 | 3/1942 | Hayes | 266—5 |
| 2,628,830 | 2/1953 | Kerr | 266—5 |
| 2,703,298 | 3/1955 | Branson et al. | 148—16 |
| 2,845,260 | 7/1958 | Rusciano | 266—5 |
| 2,848,207 | 8/1958 | Rusciano | 266—5 |
| 3,170,681 | 2/1965 | Davis | 266—5 |
| 3,171,759 | 3/1965 | Glenn | 148—16 |

FOREIGN PATENTS

| | | |
|---|---|---|
| 881,953 | 7/1953 | Germany. |
| 273,764 | 7/1951 | Switzerland. |

CHARLIE T. MOON, *Primary Examiner.*

WHITMORE A. WILTZ, *Examiner.*

M. L. FAIGUS, *Assistant Examiner.*